United States Patent [19]
Watson

[11] Patent Number: 5,225,045
[45] Date of Patent: Jul. 6, 1993

[54] SYSTEM AND METHOD FOR RECYCLING MATERIALS FROM DISPOSED DIAPERS

[76] Inventor: Dana L. Watson, 1921 10th St., Wichita Falls, Tex. 76301

[21] Appl. No.: 655,300

[22] Filed: Feb. 14, 1991

[51] Int. Cl.⁵ .............................. D21B 1/08
[52] U.S. Cl. .......................... 162/4; 162/55; 162/60; 162/56; 68/5 D; 68/58; 68/142; 241/46.17
[58] Field of Search ............ 162/4, 55, 56, 60, 5; 68/5 D, 13 R, 58, 142, 181 R, 181 D; 241/46.17, DIG. 38; 209/2; 521/40

[56] References Cited

U.S. PATENT DOCUMENTS

| | | | |
|---|---|---|---|
| 2,700,287 | 1/1955 | Sulzmann | 68/181 R |
| 3,392,083 | 6/1968 | Illingworth | 162/5 |
| 3,833,465 | 9/1974 | Cambell | 162/55 |
| 3,890,220 | 6/1975 | Anderson | 209/3 |
| 3,909,397 | 9/1975 | Aldinger | 209/3 |
| 4,000,031 | 12/1976 | Acobas | 162/4 |
| 4,303,501 | 12/1981 | Steffens | 209/2 |
| 4,305,507 | 12/1981 | Wittkopf | 209/3 |
| 4,332,638 | 6/1982 | Mauer et al. | 162/4 |
| 4,360,439 | 11/1982 | Calmanti et al. | 162/5 |
| 4,607,509 | 8/1986 | Stoll | 68/27 |
| 4,760,717 | 8/1988 | Ponzielli | 68/181 R |
| 4,838,995 | 6/1989 | Klausen | 162/18 |
| 4,915,830 | 4/1990 | Mackay et al. | 210/209 |
| 4,971,449 | 10/1990 | Hendren | 68/58 |

OTHER PUBLICATIONS

Webster's Third New International Dictionary, Chicago, Encyclopedia Britannica, Inc (1976) pp. 2579, 428, 2366 and 1018.
76032 CBW Batch Washing System, Pillerin Milnor Corporation, 1984.
66/44 FLT Tilting Washing/Extractor, Washex Machinery Corp., 1990.
"Report on Disposable Diaper Recycling Program" Final Report to Procter & Gamble Company, Apr. 29, 1991, by Arthur D. Little, Inc., Acorn Park, Cambridge, Mass.

Primary Examiner—W. Gary Jones
Assistant Examiner—Brenda Lamb
Attorney, Agent, or Firm—Geoffrey A. Mantooth

[57] ABSTRACT

First and second washing machines are utilized to recycle plastic and cellulose from disposed diapers. The disposed diapers are loaded into the first washing machine and, while being agitated, are washed in water, alkali and soap. During washing, the cellulose becomes separated from the plastic. The cellulose is drained out of the first washing machine with the water, leaving the plastic in the first washing machine. The plastic is then cleaned in the first washing machine. A pump transfers the cellulose and water to the second washing machine. In the second washing machine, the cellulose is washed in alkali and soap while being agitated. The second washing machine has a screen for retaining the cellulose therein, while passing the water and waste material.

11 Claims, 4 Drawing Sheets

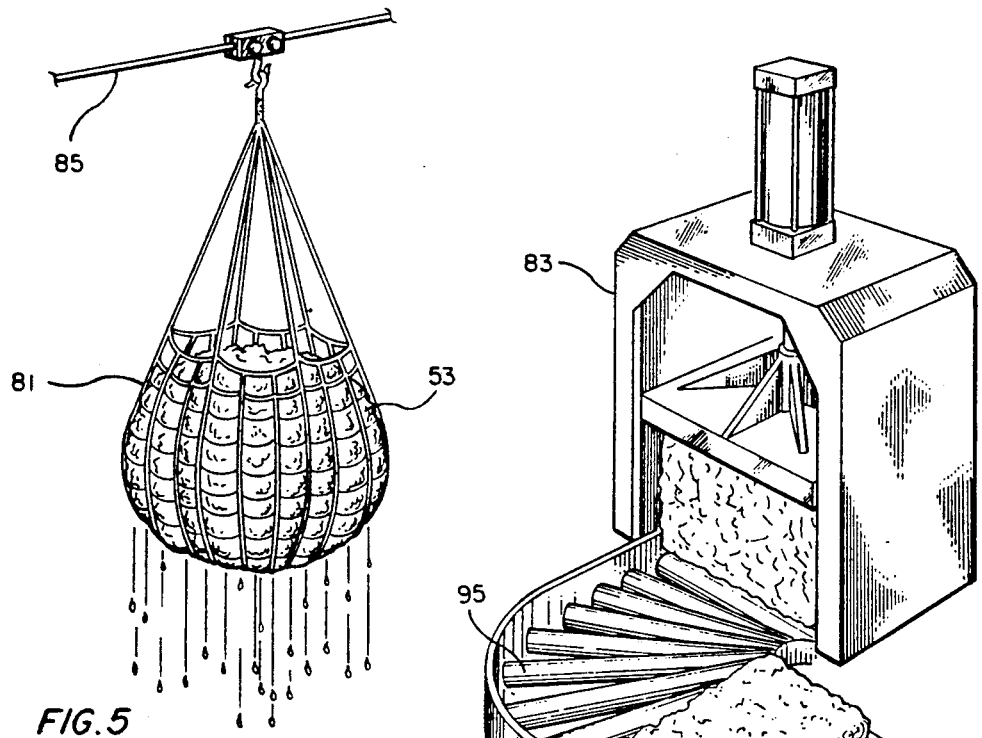
FIG. 5
FIG. 6
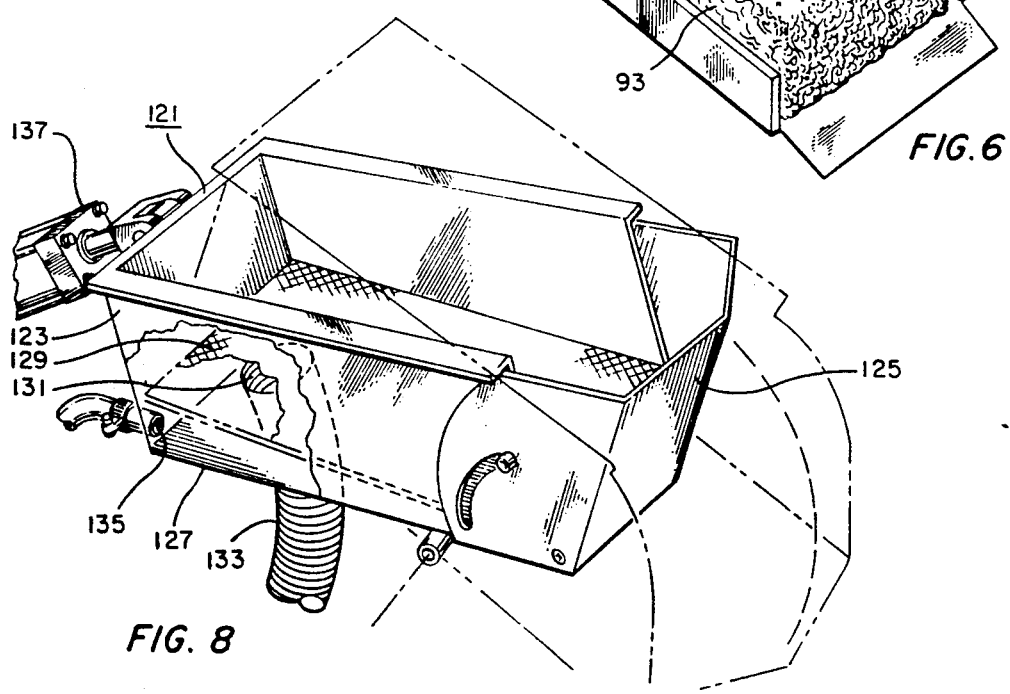
FIG. 8

SYSTEM AND METHOD FOR RECYCLING MATERIALS FROM DISPOSED DIAPERS

FIELD OF THE INVENTION

The present invention relates to systems and methods for recovering and extracting materials from waste products such as disposed diapers and disposed newspapers.

BACKGROUND OF THE INVENTION

Disposable diapers are primarily made up of plastic and cellulose. The plastic provides a moisture-proof lining on the outside of the diaper and the cellulose provides the bulky absorbent media on the inside. The diaper essentially provides a bag that is worn by a human being. The cellulose holds and retains all moisture, while the plastic ensures that there is no leakage through the bag. Some disposable diapers are marketed under names such as "ultra thin" or the like. These diapers use less cellulose and include a super absorbent molecule (SAM), which absorbs as much as one thousand times its own mass in water.

Disposable diapers have become immensely popular. Disposable diapers of course are used just once and thrown away after they have been soiled with waste material. The ultimate disposal of the diapers typically involves transporting them to the local landfill. Environmentalists decry this disposal of diapers as being wasteful both in the manufacture and disposal of the diapers. The manufacture of disposable diapers requires forest products to obtain the necessary cellulose, while the disposal of the diapers utilizes valuable landfill space. Many communities around the country are seeing the exhaustion of their landfill space in conjunction with the political difficulty of finding new landfill space. Thus, there is a real need to reclaim the materials in disposable diapers.

The same can also be said of newspapers, which are read and then thrown away. Recycling of newsprint from newspapers has been going on for some time. Prior art methods of recycling newsprint involves soaking the newsprint in vats. The newsprint is then transferred to other, successively cleaner vats. Unfortunately, the ink follows the newsprint from vat to vat.

SUMMARY OF THE INVENTION

It is a object of the present invention to provide a system and a method for recycling materials, such as plastic and cellulose, from disposable diapers.

It is a further object of the present invention to provide a method for recycling newsprint from newspapers.

The method of the present invention recycles absorbent material and plastic from disposed diapers. The disposed diapers are mixed with water, alkali and soap. The mixture is agitated so as to separate the absorbent material from the plastic. The absorbent material and the water is removed from the plastic. The plastic is washed with water so as to produce clean plastic. The absorbent material is washed with water, alkali and soap so as to produce clean absorbent material.

In one aspect, air is blown into the washing process, wherein the air increases the agitation of the materials and initiates biological breakdown of the waste material.

In still another aspect, first and second washer means are provided for washing the disposed diapers. The disposed diapers, water, alkali and soap are loaded into the first washer means. The disposed diapers are then agitated in the first washer means so as to separate the absorbent material from the plastic and so as to form a mixture that includes the absorbent material and water. The absorbent material and water is drained out of the first washer means while retaining the plastic inside of the first washer means. The plastic is washed in the first washer means until the plastic is clean. The absorbent material is transferred to the second washer means and washed therein with water, alkali and soap until the absorbent material is clean.

In still another aspect, the absorbent material is transferred from the first washer means to the second washer means by pumping a mixture of the absorbent material and water to the second washer means. The plastic is washed in the first washer means by a tumbling action so as to form the plastic into balls. The plastic is washed in hot water after the absorbent material is drained out of the first washer means. Then, the plastic is washed in cold water thereby causing the plastic to shrink and solidify. The cleaned absorbent material is removed from the second washer means and the water is extracted therefrom.

The system of the present invention recycles plastic and absorbent material from disposed diapers. The system includes a first washing means, a second washing means and pump means. The first washing means is for washing goods and includes a first chamber and a first basket. The first chamber is adapted to contain water and has a drain for draining the contents of the first chamber. The first basket is contained in the first chamber and is adapted to contain the diapers. The first basket is perforated so as to pass a mixture of the absorbent material and water therethrough and so as to retain the plastic inside of the first basket. The first basket is movable so as to agitate the diapers inside thereof. The second washing machine is also for washing goods and includes a second chamber and a second basket. The second basket is contained in the second chamber. The second chamber is adapted to contain water and has a drain for draining the contents of the second chamber. The second basket is perforated with smaller perforations than the perforations of the first basket so as to pass water therethrough while retaining the absorbent material therein. The second basket is movable so as to agitate the contents thereof. The second washing means has input means for receiving said absorbent material into said second washing means. The pump means is for pumping the mixture of absorbent material and water from the first washing means to the second washing means input means. The pump means has an input that is connected to the first chamber drain and has an output that discharges to the second chamber input means.

In one aspect, the system of the present invention provides that the first basket is lined with a first mesh, which first mesh provides the appropriate sized first basket perforations so as to pass a mixture of said absorbent material and water therethrough while retaining said plastic inside of said first basket. The second basket is lined with a second mesh, which second mesh provides the appropriate sized second basket perforations so as to pass water therethrough while retaining said absorbent material inside of said second basket.

With the present invention, the primary materials making up disposable diapers are recovered and cleaned for subsequent use. Disposable diapers are made up of absorbent cellulose and a plastic barrier for holding moisture and waste material inside of the diaper. Soiled disposed diapers are first washed in a first washer means so as to separate the plastic and cellulose from each other. The cellulose drains out of the first washer means with the water and waste material. The plastic stays in the first washer means and is cleaned therein. The cellulose, water and waste material are pumped to a second washer means which cleans the cellulose of all waste material. The waste material drains out of the second washer means with the wash water, while the cellulose is retained in the second washer means. The plastic and cellulose are cleaned with water, alkali and soap. Cleaned plastic and cellulose are thus produced from soiled disposed diapers.

BRIEF DESCRIPTION OF THE DRAWINGS

FIG. 5 is an isometric view of a sling for draining cleaned cellulose.

FIG. 6 is an isometric view of an extractor for pressing water out of the cleaned cellulose.

FIG. 8 is a detailed view of the holding tank of FIG. 7.

DESCRIPTION OF PREFERRED EMBODIMENTS

The system and method of the present invention involves the recycling of disposable diapers that have been soiled with waste material. Disposable diapers typically are made up of plastic and cellulose. The plastic provides a moisture-proof barrier, while the cellulose, which is located inside of the plastic, acts as an absorbent media to hold and retain fluids.

The system and method of the present invention recycles the plastic and cellulose in the soiled diapers. The plastic and cellulose are separated from each other during an initial cleaning step. Then, the plastic and cellulose are separately cleaned of all waste material. The waste material is discharged, typically into a sewer system, for proper sanitary disposal. The cleaned cellulose and plastic can be sold and reused in manufactured products.

Figure 1:
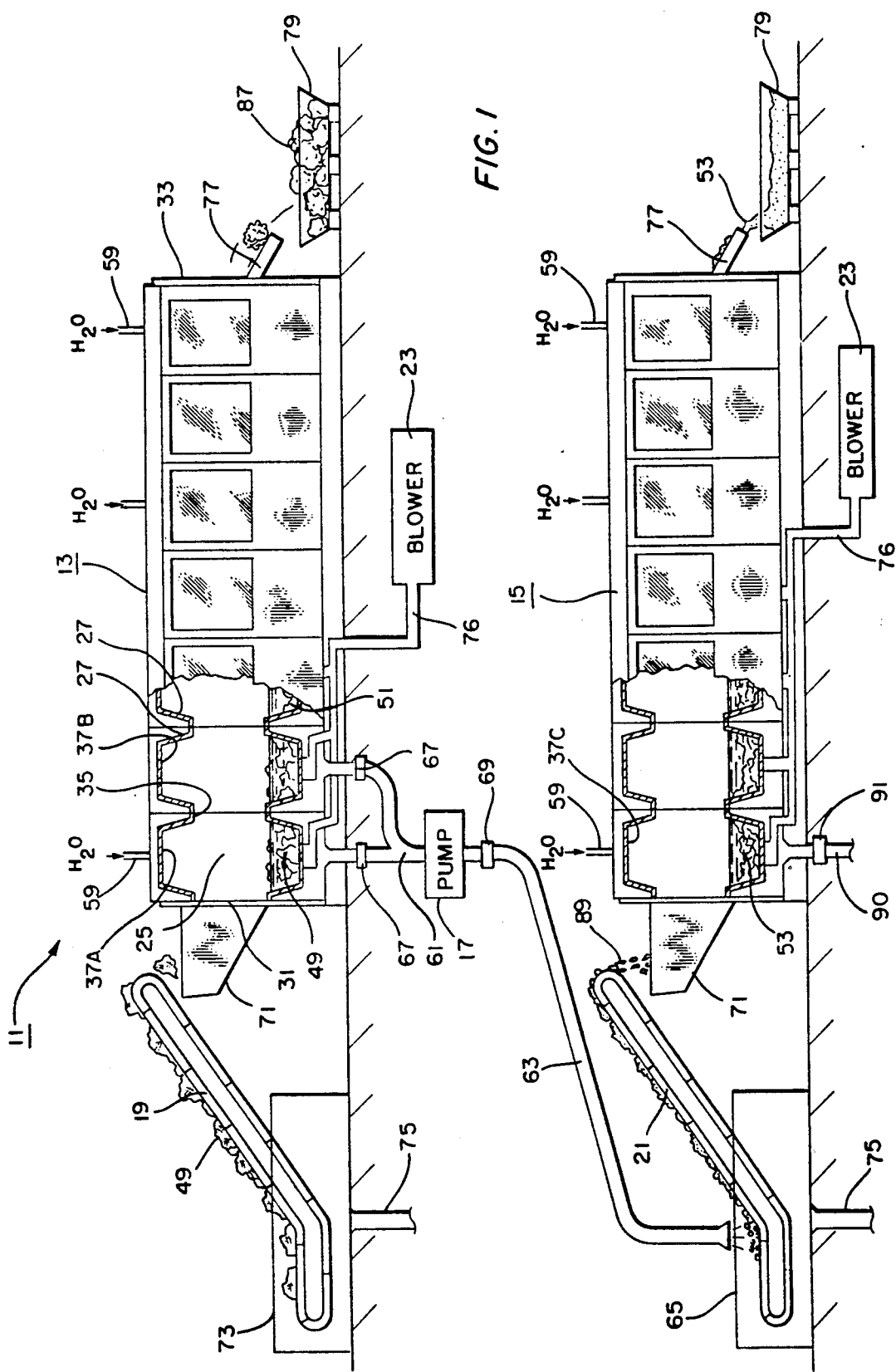
FIG. 1 is a schematic side view of the system of the present invention, in accordance with a preferred embodiment.

In FIG. 1, there is shown a schematic side view of the system 11 used to practice the method of the present invention, in accordance with a preferred embodiment. The system includes a first washing machine 13, a second washing machine 15, a transfer pump 17 between the first and second washing machines, a first infeed conveyor 19, a second infeed conveyor 21 and blowers 23.

Figure 2:
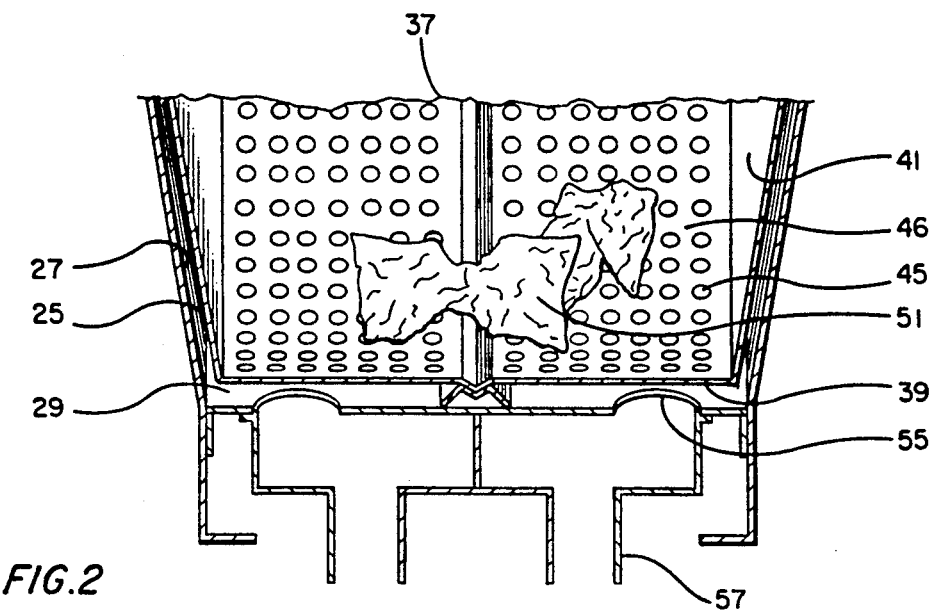
FIG. 2 is a detailed longitudinal cross-sectional view of a portion of the first basket and first chamber in the first washing machine.

The first and second washing machines 13, 15 are substantially similar to each other. The washing machines are continuous batch washing machines. The washing machines, which are conventional and commercially available, each have plural chambers 25 for washing goods therein. The chambers 25 are waterproofed so as to hold the wash water. Referring to FIG. 2, each chamber is formed by side walls 27 and a cylindrical outer wall 29. The chambers 25 in each washing machine are arranged side-by-side in a row such that the side walls 27 are adjacent to each other. Each chamber 25 in a washing machine has a basket 37 for holding the goods to be washed. Each basket 37 has a cylindrical outside wall 39 and two side or end walls 41. A longitudinal axis extends between the side walls 41. The baskets 37 in each washing machine are arranged so that their longitudinal axes are colinear.

Each washing machine has an inlet 31 communicating with one of the end baskets and an outlet 33 communicating with the other of the end baskets. Each basket 37 communicates with its adjacent baskets by way of openings 35 in the side walls 41. The goods to be washed are loaded into the washing machines at the respective inlet 27, travel through the baskets 37 one by one while being washed, moving from chamber to chamber by way of the openings 35, and are discharged from the machines at the respective outlet 33.

Figure 3:
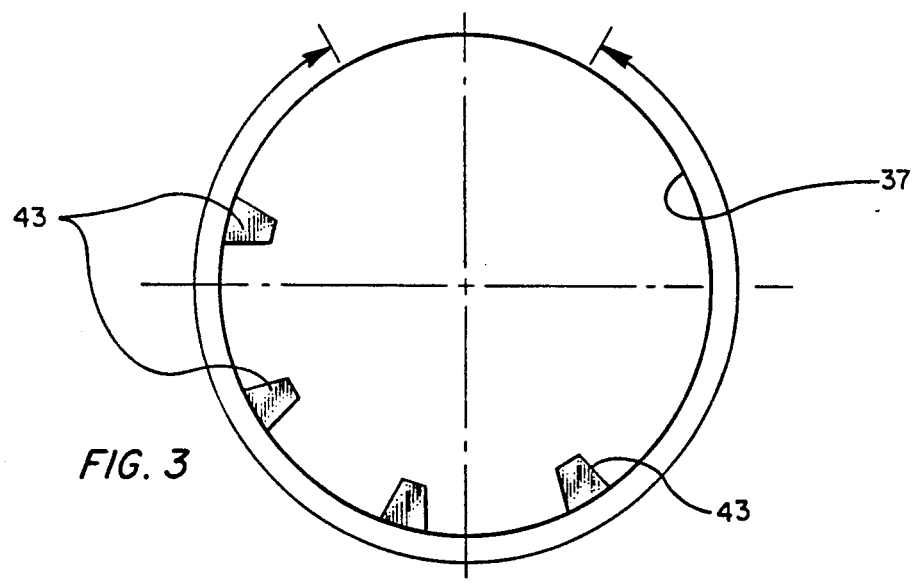
FIG. 3 is a transverse view of one of the baskets, showing the range of normal rotation and the ribs.

Each washing machine has a motor (not shown) for rotating the baskets 37 about their longitudinal axes within the fixed chambers 25. All of the baskets rotate in unison and in the same direction. Rotation of the baskets causes the goods inside to be agitated, thereby increasing the effectiveness of the wash. Each basket 37 is provided with ribs 43, as shown in FIG. 3, to further increase the agitation of the goods. The ribs 43 are mounted to the inside surface of the outside wall 39 and are spaced apart. As the basket 37 is rotated, the goods are lifted and dropped by the ribs 43. The basket 37 rotates about 300 degrees in one direction and then reverses to rotate 300 degrees in the other direction. This reversing of the direction of rotation further increases the agitation of the goods. The goods are transferred from one basket to the next basket in a conventional manner by rotating the baskets beyond 300 degrees.

Figure 4:
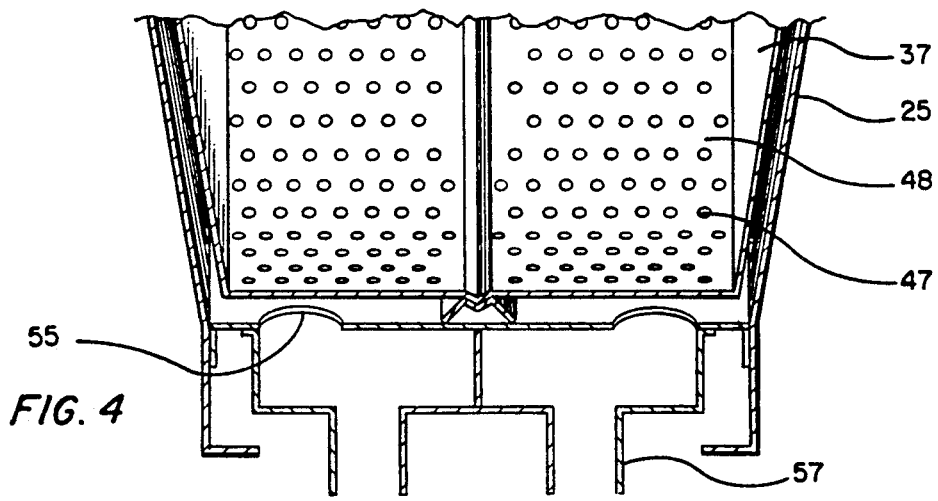
FIG. 4 is a detailed longitudinal cross-sectional view of a portion of one of the baskets and associated chamber in the second washing machine.

The outside wall 39 of each basket 37 is perforated with numerous openings 45, 47. The openings 45 allow water to be drained from the baskets. The size of the openings 45, 47 in the baskets in the first and second washing machines 13, 15 differ. In the first washing machine 13, the first two baskets 37A, 37B have openings 45 that are sized so as to retain the plastic portion of the diapers while allowing the cellulose, waste material and water to pass therethrough. It has been found that stainless steel 304 wire mesh 46, with a wire diameter of 0.012 inches and having 30 wires per inch, works satisfactorily. In the second washing machine 15, all of the baskets 37C have openings 47 that are sized to retain the cellulose inside of the basket, while passing water and waste material (see FIG. 4). It has been found that stainless steel 316 wire mesh 48, with a wire diameter of 0.010 inches and having 40 wires per inch works satisfactorily. In FIGS. 2 and 4, the wire mesh 46, 48 and the openings 45, 47 have been shown schematically, in order to better illustrate the openings.

The baskets 37 are modified to provide the appropriate sized openings. The baskets in a washing machine are manufactured with openings of a relatively large size in the outside wall. To provide the proper size openings, the appropriate sized wire mesh is coupled to the inside surface of the outside wall 39 of a basket by welding. Alternatively, the wire mesh could be coupled to the outside wall by way of buttons, which buttons are coupled to the screen mesh and which snap fit into some of the openings in the outside wall 39.

Each chamber 25 has a drain opening 55 located at the bottom of the chamber. Drain pipes 57 lead from the drain openings 55 to the next adjacent chamber which is nearest to the inlet 31. This provides a flow of wash water from chamber to chamber which is counter to the flow of goods from chamber to chamber. The goods proceed from the inlet 31 to the outlet 33, while the wash water proceeds from the outlet to the inlet. This counterflow conserves water. Fresh or clean water inlets 59 are provided at the last chamber and may be provided at other chambers as desired.

The first two chambers of the first washing machine 13 have drain pipes 61 that lead from the respective openings 55. The drain pipes 61 are both connected to the input of the pump 17. The pump 17 is a conventional, commercially available nonclogging process pump which is suitable for pumping fluids with entrained solids and fibrous materials. The output of the pump 17 is connected to a conduit 63 that discharges onto the second conveyor 21 for the second washing machine 15. The conduit 63 discharges onto the conveyor 21 at a location that is within a drain tank 65. Dump valves 67 are provided in each of the drain pipes 61 leading from the first two chambers of the first washing machine. The dump valves 67 control the draining of the fluids from the first two chambers. A check valve 69 is provided in the discharge conduit 63 from the pump. The check valve 69 prohibits back flow into the pump and the chambers.

Each washing machine 13, 15 has an input conveyor 19, 21 for loading the goods to be washed into the respective first basket. Each washing machine is provided with a funnel 71 for receiving the goods and channeling them into the inlet 31. The input conveyors 19, 21 convey the goods from draining tanks 73, 65, usually located on the ground, up to the funnels 71, where the goods are dumped. The conveyors each have a perforated surface to allow the materials to drain before being loaded into the washing machines. Each drain tank 73, 65 is provided with a floor drain 75 that is connected with the drain system. Other loading devices, such as slings or chutes, could be used in lieu of conveyors.

Each washing machine is also provided with a blower 23 for injecting air into the first few chambers of the washing machine. The blowers 23 are connected to the washing machine chambers by way of conduits 76. The air conduits 76 are connected to the chambers at locations that are beneath the respective baskets such that air bubbles up into the baskets. The addition of air to the washing process initiates and speeds up the biological break down of the waste material in the disposed diapers. The blowers are conventional, commercially available units. In the preferred embodiment, the blowers provide 200 to 500 cubic feet per minute of air at about 5 psig to each washing machine.

The outlet of each washing machine is made up of a ramp 77 that dumps the goods from the last chamber to a bin 79. The goods in the bin 79 of the second washing machine are transferred to a sling 81 (see FIG. 5) for draining and transport to an extractor 83 (see FIG. 6). The sling is made of mesh material, so as to allow the goods inside to drain while being transported by a cable 85. The extractor 83 is conventional and commercially available. The extractor compresses the moisture out of the goods.

The method of the present invention will now be described. Referring to FIG. 1, the disposed diapers 49 are loaded onto the first washing machine conveyor 19 at a collection point. The collection point is located within the drain tank 73 so that fluids may drain out. The disposed diapers are soiled with urine and fecal material. No preprocessing, such as shredding or opening, of the diapers is required.

The diapers 49 are loaded into the first basket 37A of the first chamber of the first washing machine 13. There, the diapers are mixed with water, alkali and soap. The water is fresh, clean, cold (75 degrees F.) water from a water inlet 59 connected to the first chamber. The particular alkali used in the preferred embodiment is orthosilicate. A sufficient amount of alkali is added to raise the pH of the mixture to the desired level, between 10.5 to 18. Higher pH mixtures are required for greasier items. In practice it has been found that pH levels of 13-14 work well. The soap has a neutral pH of 7. The first basket is rotated back and forth around its longitudinal axis so as to agitate the mixture. While being agitated, the cellulose in the diapers become separated from the plastic. In addition, the process of cleaning the waste material from the cellulose and the plastic is begun. The high pH caused by the alkali makes the soil or waste release from the cellulose and the plastic much easier. The neutral soap holds the released waste material in solution in the water, preventing the waste material from reattaching to the cellulose and plastic. Air provided by the blower 23 bubbles up from the bottom of the chamber to enter the basket and further increase the agitation of the mixture, thereby assisting in the separation of the cellulose from the plastic. In addition, the air aerates the water mixture to provide favorable conditions for the biological breakdown of the waste materials.

After the diapers have been washed for a predetermined period of time in the first basket, for example about 10 minutes, the dump valves 67 are opened, allowing the first chamber and the first basket 37A (and the second chamber and second basket 37B) to drain. The plastic 51 is retained inside of the first basket by the screen mesh, while a sludge-like fluid drains out of the basket 37A and the chamber. The sludge-like fluid is made up of water, the separated cellulose, the waste materials and the alkali and soap. The first basket, in conjunction with the other baskets in the first washing machine, is then rotated past 300 degrees so as to transfer its contents to the next basket, namely the second basket 37B. The contents of the second basket are washed as described with respect to the first basket, in order to separate any remaining cellulose from the plastic. After the wash cycle has been completed in the second basket, the dump valves 67 are opened, allowing the second basket 37B and the second chamber to drain.

Because the first washing machine 13 is of the continuous type, the first basket 37A is loaded with dirty diapers 49 each time after it empties into the drain and into the second basket. This maintains a continuous flow of materials through the system. The operation of the loading conveyors 19, 21 is intermittent, to operate only when the respective first basket needs to be loaded with goods. Both dump valves 67 operate together to open and then close in unison.

The contents of the second basket empties into the third basket. By this stage, the contents of the third basket is plastic 51 that is free of cellulose, the cellulose having been separated and drained away in the first two baskets. As the plastic continues through the remaining chambers of the first washing machine 13, the plastic is washed in warm water (130 degrees F.) and in alkali and soap to clean the plastic of all waste material. The plastic is also washed in a water soluble aromatic solvent, such as mineral spirits or paint remover, to remove any elastic and labeling that is glued to the plastic. The plastic is then rinsed. As the plastic proceeds through the first washing machine 13, it is formed into a ball by the rotating action of the baskets 37. At the second to last basket, the plastic 51 is exposed to hot water (about 240 degrees F.) thereby causing the plastic to shrink. At the last basket, the plastic is exposed to cold water, thereby solidifying the plastic and preserving the ball shape. The cleaned plastic 87 is then dumped from the last basket into a bin 79.

The water-cellulose sludge that has been drained out of the first two baskets of the first washing machine 13 enters the pump 17, which then pumps it through the conduit 63 to discharge onto the second conveyor 21 loading the second washing machine 15. The loading point of the second conveyor 21 is located within the drain tank 65, wherein much of the water and associated waste material drains out of the cellulose before the cellulose is loaded into the second washing machine 15.

The water-cellulose sludge 89 is then loaded into the first basket of the second washing machine 15. The cellulose is washed in hot water (about 170 degrees F.), alkali and soap. After the washing cycle, the dump valve 91 in the first chamber is opened, allowing the first chamber to drain into the drain system by way of the drain pipe 90. The wire mesh in the baskets of the second washing machine, which has smaller openings than the wire mesh in the first washing machine, retains the cellulose inside of the baskets. The cellulose in the first basket is then transferred to the second basket, wherein it is washed again in hot water, alkali and soap. A sufficient amount of alkali is added to raise the pH of the mixture to the desired level, between 10.5 to 18. In practice, it has been found that pH levels of 13-14 work well. In the next basket, the cellulose is rinsed with hot water and in the fourth basket, the cellulose is washed with bleach. The bleach, which can be chlorine bleach, hydrogen peroxide or oxalic acid, whitens and sanitizes the cellulose. The cellulose is then rinsed with water and then rinsed with water and sour, or sodium fluorocarbate, to bring the pH down to about 6.5 to 7.0.

The cellulose 53 is discharged from the last basket of the second washing machine 15 and is loaded into a sling 81 as shown in FIG. 5. The sling 81 is formed from a net that retains the cleaned cellulose and allows water to drain out. The sling is mounted onto a cable 85, which moves the sling from the outlet of the second washing machine 15 to the input of the extractor 83. The contents in the sling are loaded into the input of the extractor. The extractor 83 presses the cellulose into a block 93 so as to extract the water in the cellulose. The resulting block 93 of cellulose is then moved along a conveyor 95 from the extractor to a shipping or storage location.

Some diapers reduce the amount of cellulose required to absorb moisture by adding a substance referred to in the industry as super absorbent molecule (SAM). SAM absorbs many times its own weight in moisture. The SAM is separated from the plastic in the first washing machine 13, along with the cellulose. The SAM is then pumped with the cellulose to the second washing machine 15. In the second washing machine, the SAM may be neutralized and removed from the cellulose. After the cellulose has been washed with alkali and soap, the cellulose is washed in water and sodium silicofluoride, a salt. The sodium silicofluoride neutralizes the SAM, and allows it to be drained out of the cellulose with the rinse water.

The water that enters the drain system from the washing machines 13, 15 is of course contaminated with the waste material from the disposed diapers. This waste water can be drained into a municipal sewer system, where it will treated by the municipal sewage treatment plant. Alternatively, a dedicated sewage treatment plant can be utilized to treat the waste water from the recycling process.

Figure 7:
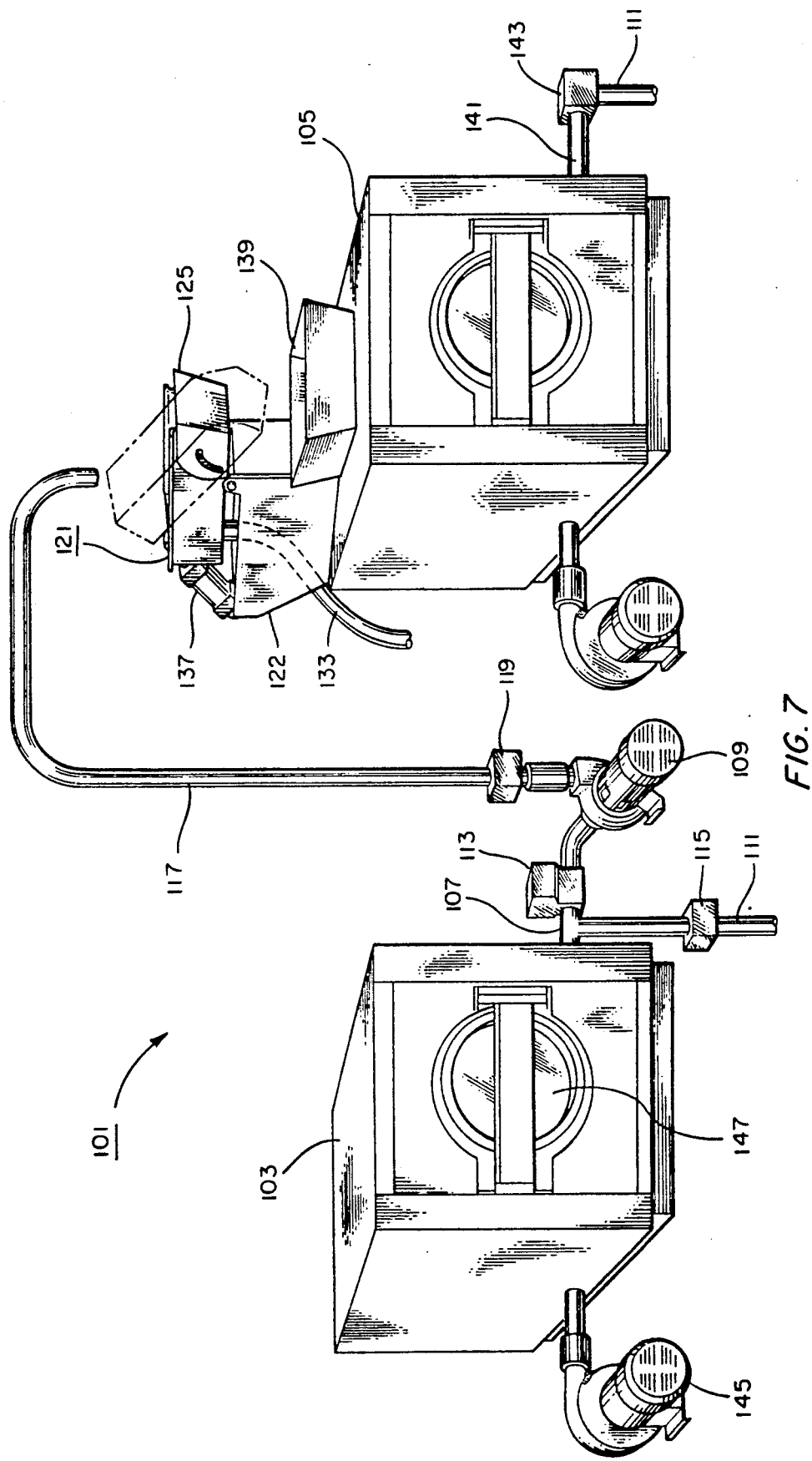
FIG. 7 is a schematic isometric view of the system of the present invention, in accordance with another embodiment.

In FIG. 7, there is shown a recycling system 101 in accordance with another embodiment. The system of FIG. 7 uses first and second washing machines 103, 105 of the batch type, rather than of the continuous type, as described above with reference to FIG. 1. Each of the first and second washing machines 103, 105 has a single basket and chamber therein. Such a system is utilized for small recycling operations, where the amount of diapers being recycled does not justify the expense of purchasing the continuous washers of FIG. 1.

The basket of the first washing machine 103 is lined with wire mesh that is similar to the wire mesh 46 in the continuous type first washing machine 13 so as to retain the plastic therein and pass the cellulose therethrough. The first washing machine 103 has a drain conduit 107 for draining away all waste water and the cellulose. The drain conduit has a T fitting, with one branch of the drain leading to a pump 109 and the other branch leading to the drain system 111. Both branches have a dump valve 113, 115 for controlling the flow therethrough. A length of conduit 117 is connected to the output of the pump 109. A check valve 119 is provided in the conduit 117 adjacent to the pump 109. The conduit 117 discharges into the top of a holding tank 121 located above the second washing machine 105.

The holding tank 121, which is shown in FIGS. 7 and 8, allows the cellulose to drain before it is loaded into the second washing machine 105. The holding tank 121 is supported above the second washing machine 105 by mounting structure 122. The holding tank 121, which is open on top, has four side walls 123, 125 and a bottom wall 127. One of the side walls operates as a door 125, moving between open and closed positions. The tank 121 has a false bottom wall 129 of wire mesh, such that there is a gap between the two bottom walls 127, 129. The wire mesh 129 allows water to drain therethrough, but retains the cellulose. A drain opening 131 is located in the bottom wall 127. A drain conduit 133 connects the drain opening 131 with the drain system. The holding tank 121 is provided with a water jet 135 beneath the wire mesh for cleaning off the wire mesh 129 with a spray of water.

The holding tank 121 is movable between a hold position and a discharge position. In the hold position, the tank 121 is substantially level so as to hold the cellulose therein; except the tank is tilted just slightly so as to locate the drain opening 131 at the lowermost position. A hydraulic piston actuator 137 moves the tank 121 to the discharge position, wherein the tank is tilted up as shown by the dash lines in FIGS. 7 and 8. In the discharge position, the door 125 swings open and allows the cellulose to fall into the basket of the second washing machine 105 by way of a loading port 139.

The second washing machine 105 is provided with the topside loading port 139, a drain conduit 141 and a dump valve 143. The basket of the second washing machine 105 is lined with wire mesh that is similar to the Wire mesh 48 in the continuous type second washing machine 15 so as to retain cellulose therein while passing water and waste material therethrough. Both washing machines 103, 105 are provided with blowers 145 to aerate the goods being washed.

To recycle diapers with the system of FIG. 7, a load of diapers is put into the first washing machine 103. The first washing machine has a door 147 that is used for loading and unloading. Assuming that the first washing machine 103 has a capacity of 275 pounds, the diapers are first washed in 75 degrees F. water with eight ounces of alkali for ten minutes. Then, the dump valve 113 to the pump 109 is opened and the first washing machine drains, with the pump 109 pumping the water-cellulose sludge into the holding tank 121. After draining for two minutes, the dump valve 113 is closed. Next, the contents of the first washing machine 103 are washed in warm water (130 degrees F.), with four ounces of alkali and soap for ten minutes. Then, the dump valve 113 to the pump is opened for two minutes, wherein the pump 109 transfers the sludge from the first washing machine 103 to the holding tank 121. The pump 109 operates whenever the dump valve 113 is opened. All of the cellulose in the first washing machine has by now been drained out, leaving the plastic. Next, the plastic is washed in warm water (130 degrees F.) and one quart of an aromatic solvent for ten minutes to release the elastic and labels from the plastic. Then, the dump valve to the pump 109 is opened for two minutes. The plastic is rinsed in 130 degrees F. water for five minutes, followed by opening the dump valve 113 for two minutes. Next, the plastic is rinsed in hot water (200 degrees F.) for five minutes for shrinkage. The dump valve 115 to the drain system 111 is opened. Cold water (75 degrees F.) is next used to rinse the plastic for five minutes to solidify the plastic. The dump valve 115 to the drain system is opened and the plastic can be unloaded. After the cleaned plastic has been unloaded, more disposed diapers are loaded into the first washing machine 103 and the washing process is repeated.

The water-cellulose sludge that has been pumped by the pump 109 is allowed to drain in the holding tank 121. The cellulose is then dumped into the second washing machine 105 by way of the loading port 139, where it is washed in water (170 degrees F.), eight ounces of alkali and soap for ten minutes. The dump valve 143 is then opened for two minutes, allowing the water and waste material to dump into the drain system 111. The cellulose is again washed in water (170 degrees F.) with ten ounces of alkali and soap for ten minutes. The dump valve 143 is opened for two minutes. The cellulose is rinsed for two minutes with water (170 degrees F.), followed by opening the dump valve for two minutes. Then, the cellulose is washed in one quart of bleach and 150 degrees F. water for ten minutes, followed by opening the dump valve for two minutes. The cellulose is rinsed with 130 degree F. water for two minutes, followed by opening the dump valve for two minutes. Next, the cellulose is rinsed in 110 degree F. water for two minutes, before the washing machine is dumped to the drain system for two minutes. Then, the cellulose is washed for five minutes in a rinse of 75 degree F. water and six ounces of sour. The washing machine is dumped to the drain system and the cleaned cellulose is unloaded. The cellulose is put into a sling 81 and then transferred to an extractor 83 to extract moisture, as described above.

In addition to recycling plastic and cellulose from disposed diapers, the method and system of the present invention also recycles newsprint from newspapers and cleans the ink off of the newsprint. Newsprint is similar to the cellulose found in diapers and as such can be cleaned with the same system and methods for cleaning cellulose. Newsprint and cellulose are both made from wood pulp.

To recycle newspapers, a load of newspapers is put into the second washing machine 15, 105. The same washing process as described above with washing the cellulose in the second washing machine is utilized to wash the newspaper. The washing process removes the ink from the paper and dumps it into the drain system 111. The wire mesh 48 in the second washing machine retains the paper inside of the basket, while allowing the ink and water to pass therethrough. The cleaned newspaper is removed from the second washing machine 15, 105 and is loaded into the sling 81 and the extractor 83 to extract the moisture from the paper.

The foregoing disclosure and the showings made in the drawings are merely illustrative of the principles of this invention and are not to be interpreted in a limiting sense.

I claim:

1. A system for recycling materials from disposed diapers, said diapers comprising plastic and an absorbent material, comprising:

a) a first washing means for washing goods, said first washing means comprising a first chamber and a first basket, said first chamber being structured and arranged to contain water, said first chamber having a first chamber drain for draining the contents of said first chamber, said first basket being contained in said first chamber and being structured and arranged to contain said diapers, said first basket being perforated so as to pass a mixture of said absorbent material and water therethrough and so as to retain said plastic inside of said first basket, said first washing means comprising first means for agitating said diapers so as to separate said absorbent material from said plastic, said first means for agitating comprising means for moving said first basket so as to agitate said diapers inside thereof;

b) a second washing means for washing goods, said second washing means comprising a second chamber and a second basket, said second basket being contained in said second chamber, said second chamber being structured and arranged to contain water, said second chamber having a second chamber drain for draining the contents of said second chamber, said second basket being perforated with smaller perforations than the perforations of said first basket so as to pass water therethrough while retaining said absorbent material therein, said second basket being movable so as to agitate the contents thereof, said second washing means having input means for receiving said absorbent material into said second washing means;

c) pump means for pumping said mixture of absorbent material and water from said first washing means to said second washing means input means, said pump means having an input that is connected to said first chamber drain and having an output that discharges into said second washing means input means.

2. The system of claim 1 wherein each of said first and second washing means comprises continuous type washing means having plural chambers and plural baskets therein, said continuous type washing means allowing plural loads of said diapers and said absorbent material to be washed simultaneously.

3. The system of claim 1 further comprising blower means for blowing air under pressure into said first basket during washing, said blower means being connected to said first chamber and being located exteriorly of said first basket, wherein said air provides an increase in the agitation and initiates biological breakdown of waste material soiling said disposed diapers.

4. A system for recycling materials from disposed diapers, said diapers comprising plastic and an absorbent material, comprising:

a) a first washing means for washing goods, said first washing means comprising a first chamber and a first basket, said first chamber being structured and arranged to contain water, said first chamber having a first chamber drain for draining the contents of said first chamber, said first basket being contained in said first chamber and being structured and arranged to contain said diapers, said first basket being perforated so as to pass a mixture of said absorbent material and water therethrough and so as to retain said plastic inside of said first basket, said first washing means comprising first means for agitating said diapers so as to separate said absorbent material from said plastic, said first means for agitating comprising means for moving said first basket so as to agitate said diapers inside thereof;

b) a second washing means for washing goods, said second washing means comprising a second chamber and a second basket, said second basket being contained in said second chamber, said second chamber being structured and arranged to contain water, said second chamber having a second chamber drain for draining the contents of said second chamber, said second basket being perforated with smaller perforations then the perforations of said first basket so as to pass water therethrough while retaining said absorbent material therein, said second basket being movable so as to agitate the contents thereof, said second washing means having input means for receiving said absorbent material into said second washing means;

c) pump means for pumping said mixture of absorbent material and water from said first washing means to said second washing means input means, said pump means having an input that is connected to said first chamber drain and having an output that discharges into said second washing means input means;

d) said second washing means input means comprising input draining means for draining water out of said absorbent material from said first washing means before said absorbent material is put into said second washing means, said input draining means being located so that said pump means output discharges into said input draining means, said input draining means being structured and arranged to load drained absorbent material into said second washing means.

5. The system of claim 4 wherein said input draining means comprises a holding tank having a perforated wall for supporting said absorbent material.

6. A system for recycling materials from disposed diapers, said diapers comprising plastic and an absorbent material, comprising:

a) a first washing means for washing goods, said first washing means comprising a first chamber and a first basket, said first chamber being structured and arranged to contain water, said first chamber having a first chamber drain for draining the contents of said first chamber, said first basket being contained in said first chamber and being structured and arranged to contain said diapers, said first basket being perforated so as to pass a mixture of said absorbent material and water therethrough and so as to retain said plastic inside of said first basket, said first basket being movable so as to agitate said diapers inside thereof;

b) a second washing means for washing goods, said second washing means comprising a second chamber and a second basket, said second basket being contained in said second chamber, said second chamber being structured and arranged to contain water, said second chamber having a second chamber drain for draining the contents of said second chamber, said second basket being perforated with smaller perforations than the perforations of said first basket so as to pass water therethrough while retaining said absorbent material therein, said second basket being movable so as to agitate the contents thereof, said second washing means having input means for receiving said absorbent material into said second washing means;

c) pump means for pumping said mixture of absorbent material and water from said first washing means to said second washing means input means, said pump means having an input that is connected to said first chamber drain and having an output that discharges into said second washing means input means;

d) said second washing means input means comprising input draining means for draining water out of said absorbent material from said first washing means before said absorbent material is put into said second washing means, said input means draining means being located so that said pump means output discharges into said input draining means, said input draining means being structured and arranged to load drained absorbent material into said second washing means;

e) blower means for blowing air into said first basket during washing, wherein said air provides an increase in the agitation and initiates biological breakdown of waste material on said diapers;

f) said first basket perforations additionally comprise a first mesh coupled to said first basket, said first mesh providing appropriate sized first basket perforations so as to pass a mixture of said absorbent material and water therethrough while retaining said plastic inside of said first basket, and said second basket perforations additionally comprise a second mesh coupled to said second basket, said second mesh providing appropriate sized second basket perforations which are smaller than said first mesh basket perforations so as to pass water therethrough while retaining said absorbent material inside of said second basket;

g) extractor means for extracting water out of said goods that are washed by said second washing means, said extractor means being positioned with respect to said second washing means so as to receive said goods that are washed by said second washing means.

7. A system for recycling material from disposed diapers, said diapers comprising plastic and an absorbent material, comprising:
a) a first washing means for washing goods, said first washing means comprising a first chamber and a first basket, said first chamber being structured and arranged to contain water, said first chamber having a first chamber drain for draining the contents of said first chamber, said first basket being contained in said first chamber and being structured and arranged to contain said diapers, said first basket being perforated so as to pass a mixture of said absorbent material and water therethrough and so as to retain said plastic inside of said first basket, said first basket being movable so as to agitate said diapers inside thereof;
b) a second washing means for washing goods, said second washing means comprising a second chamber and a second basket, said second basket being contained in said second chamber, said second chamber being structured and arranged to contain water, said second chamber having a second chamber drain for draining the contents of said second chamber, said second basket being perforated with smaller perforations than the perforations of said first basket so as to pass water therethrough while retaining said absorbent material therein, said second basket being movable so as to agitate the contents thereof, said second washing means having input means for receiving said absorbent material into said second washing means;
c) pump means for pumping said mixture of absorbent material and water from said first washing means to said second washing means input means, said pump means having an input that is connected to said first chamber drain and having an output that discharges into said second washing means input means;
d) said first basket perforations additionally comprise a first mesh coupled to said first basket, said first mesh providing appropriate sized first basket perforations so as to pass a mixture of said absorbent material and water therethrough while retaining said plastic inside of said first basket, and said second basket perforations additionally comprise a second mesh coupled to said second basket, said second mesh providing appropriate sized second basket perforations smaller than said first mesh basket perforations so as to pass water therethrough while retaining said absorbent material inside of said second basket.

8. In a first washing machine suitable for washing a first type of goods, said first type of goods comprising textiles, said first washing machine comprising a first chamber and a first basket, said first chamber being structured and arranged to contain water and having a first chamber drain, said first basket being located in said first chamber, said first basket being movable inside of said first chamber so as to agitate any goods located inside of said first basket; an improvement for recycling a second type of goods, said second type of goods comprising plastic and cellulose, the improvement in combination therewith comprising:
a) a second washing machine suitable for washing said first type of goods, said second washing machine comprising a second chamber and a second basket, said second chamber being structured and arranged to contain water and having a second chamber drain, said second basket being located in said second chamber, said second basket being movable inside of said second chamber so as to agitate any goods located inside of said second basket;
b) said second washing machine having an opening for receiving said cellulose into said second basket, said second washing machine opening being connected to said first chamber drain by conduit means;
c) said first basket having perforations that are sized so as to retain said plastic inside of said first basket while passing an effluent of water and said cellulose into said first chamber drain, said plastic and said cellulose being of said second type of goods when said second type of goods are located inside of said first basket;
d) said second basket having perforations that are sized so as to retain said cellulose inside of said second basket while passing water therethrough and into said second chamber drain;
e) transfer means for transferring said cellulose and water effluent from said first chamber through said conduit means and said second washing machine opening into said second washing machine second basket.

9. The invention of claim 8 wherein said transfer means comprises a pump.

10. In a first washing machine suitable for washing a first type of goods, said first type of goods comprising textiles, said first washing machine comprising a first chamber and a first basket, said first chamber being structured and arranged to contain water and having a first chamber drain, said first basket being located in said first chamber, said first basket being movable inside of said first chamber so as to agitate any goods located inside of said first basket; an improvement for recycling a second type of goods, said second type of goods comprising plastic and cellulose, the improvement in combination therewith comprising:
a) a second washing machine suitable for washing said first type of goods, said second washing machine comprising a second chamber and a second basket, said second chamber being structured and arranged to contain water and having a second chamber drain, said second basket being located in said second chamber, said second basket being movable inside of said second chamber so as to agitate any goods located inside of said second basket;
b) said second washing machine having an opening for receiving said cellulose into said second basket, said second washing machine opening being connected to said first chamber drain by conduit means;
c) said first basket having perforations that are sized so as to retain said plastic inside of said first basket while passing an effluent of water and said cellulose into said first chamber drain, said plastic and said cellulose being of said second type of goods when said second type of goods are located inside of said first basket;

d) said second basket having perforations that are sized so as to retain said cellulose inside of said second basket while passing water therethrough and into said second chamber drain;

e) transfer means for transferring said cellulose and water effluent from said first chamber through said conduit means and said second washing machine opening into said second washing machine second basket;

f) said first basket comprises a first wall, said first wall being perforated, said first basket being modified so as to form said appropriate sized first basket perforations that are smaller than said first wall perforations, wherein a first mesh is coupled to said first basket so as to overlay said first wall perforations, said first mesh providing said appropriate sized first basket perforations wherein plastic inside of said first basket is retained by said first mesh while said first mesh passes water and said absorbent material, said second basket comprising a second wall, said second wall being perforated, said second basket being modified so as to form said appropriate sized second basket perforations that are smaller than said second wall perforations, wherein a second mesh is coupled to said second basket so as to overlay said second wall perforations, said second mesh providing said appropriate sized second basket perforations wherein said absorbent material is retained inside of said second basket while passing water therethrough.

11. A system for recycling materials, comprising:

a) disposed diapers comprising plastic and an absorbent material;

b) first and second washing machines, said first and second washing machines having respective first and second baskets that are located inside of respective first and second chambers, each basket having a cylindrical outer wall and side walls coupled to said outer wall, with each of said baskets having a rotational axis, each of said baskets being rotatable within said respective chamber about said respective rotational axis so as to agitate the contents thereof, said first and second baskets being oriented so that said respective rotational axes are horizontal, each of said chambers having a drain, each of said first and second washing machines having water inlet means for introducing water into said respective chambers;

c) said diapers being located within said first basket, said first basket outer wall having ribs mounted thereon for assisting in agitating said diapers, said first basket outer wall being perforated, said first basket perforations being sized so as to pass a mixture of said absorbent material and water therethrough and into said first chamber drain while retaining said plastic inside of said first basket;

d) said first chamber drain being connected by a conduit to said second washing machine so that said mixture can be loaded into said second basket;

e) pump means for pumping said mixture from said first washing machine to said second washing machine, said pump means being located in said conduit;

f) those portions of said absorbent material that have been pumped by said pump means being located in said second basket, said second basket outer wall being perforated, said second basket perforations being sized so as to retain said absorbent material inside of said second basket while passing water therethrough.

* * * * *